(12) United States Patent
Akavaram et al.

(10) Patent No.: US 12,174,757 B1
(45) Date of Patent: Dec. 24, 2024

(54) APPARATUS AND METHODS FOR REDUCING LATENCIES ASSOCIATED WITH LINK STATE TRANSITIONS WITHIN DIE INTERCONNECT ARCHITECTURES

(71) Applicant: QUALCOMM INCORPORATED, San Diego, CA (US)

(72) Inventors: Santhosh Reddy Akavaram, Hyderabad (IN); Prakhar Srivastava, Lucknow (IN); Sridhar Anumala, Hyderabad (IN); Ramacharan Sundararaman, San Jose, CA (US); Sonali Jabreva, Firozabad (IN); Khushboo Kumari, Hyderabad (IN); Sanjay Verdu, Tirupati (IN)

(73) Assignee: QUALCOMM Incorporated, San Diego, CA (US)

( * ) Notice: Subject to any disclaimer, the term of this patent is extended or adjusted under 35 U.S.C. 154(b) by 44 days.

(21) Appl. No.: 18/338,653

(22) Filed: Jun. 21, 2023

(51) Int. Cl.
  *G06F 13/16* (2006.01)
(52) U.S. Cl.
  CPC ........ *G06F 13/161* (2013.01); *G06F 2213/40* (2013.01)
(58) Field of Classification Search
  CPC ............................ G06F 13/161; G06F 2213/40
  See application file for complete search history.

(56) References Cited

U.S. PATENT DOCUMENTS

| | | | |
|---|---|---|---|
| 7,093,051 B2 * | 8/2006 | Haig | G06F 13/1684 710/305 |
| 9,606,604 B1 * | 3/2017 | Butter | G06F 1/3209 |
| 2001/0023466 A1 * | 9/2001 | Farmwald | G11C 8/12 711/E12.089 |
| 2004/0024945 A1 * | 2/2004 | Keller | G06F 13/161 710/305 |

* cited by examiner

*Primary Examiner* — Henry Tsai
*Assistant Examiner* — John B Roche
(74) *Attorney, Agent, or Firm* — DUANE MORRIS LLP/QUALCOMM

(57) ABSTRACT

Methods and apparatuses are provided to reduce latencies associated with state transitions in die-to-die interconnect architectures. In one example, a physical layer of a die detects a first event indicating a transition to a lower power state. In response to the first event, the physical layer transitions to a lower power state where one or more clock configuration values are read from registers and stored in memory. The physical layer then detects a second event indicating a transition to an active state. In response to the second event, the physical layer reads the clock configuration values from the memory, and writes the clock configuration values to the registers. The physical layer then transitions to a power stabilization state, and remains in the power stabilization state for an amount of time to allow clocks to stabilize. The physical layer then transitions to a training state.

28 Claims, 12 Drawing Sheets

| _____ 314 |||
|---|---|---|
| L2 Fast Control Register |||
| BIT(s) | Function ||
| [7:4] | Reserved ||
| [3:1] | L2 Fast Inactivity Timer ||
| [0] | L2 Fast Enable ||

State Definitions for Initialization

| State | Description |
|---|---|
| RESET | This is the state following primary reset or exit from TRAINERROR |
| SBINIT | Side band initialization state where the side band is detected, repaired (when applicable) and out of reset message is transmitted |
| MBINIT | Following sideband initialization, Main band (MB) is initialized at the lowest speed. Both dies perform on die calibration followed by interconnect repair (when applicable) |
| MBTRAIN | Main band (Data, Clock and Valid signals) speed of operation is set to the highest negotiated data rate. Die-to-Die training of main band is performed to center the clock with respect to Data. |
| LINKINIT | This state is used to exchange Adapter and Link management messages |
| ACTIVE | This is the state in which transactions are sent and received |
| L1/L2 | Power Management state |
| PHYRETRAIN | This state is used to begin the retrain flow for the Link during runtime |
| TRAINERROR | State is entered when a fatal or non-fatal event occurs at any point during Link Training or operation. |

FIG. 11B (PRIOR ART)

APPARATUS AND METHODS FOR REDUCING LATENCIES ASSOCIATED WITH LINK STATE TRANSITIONS WITHIN DIE INTERCONNECT ARCHITECTURES

BACKGROUND

Field of the Disclosure

This disclosure relates generally to die interconnect architectures and, more particularly, to reducing latencies associated with link state transitions within die interconnect architectures.

Description of Related Art

Die-to-die interconnect architectures allow dies, such as chiplets, to communicate over communication channels. These die-to-die interconnect architectures are used across a multitude of applications, such as telecommunication, automotive, cloud-based, gaming, enterprise, and networking applications, among various other applications. Die-to-die interconnect architectures may be developed according to a standard thereby allowing interoperability between dies, such dies from varying manufacturers. For example, Universal Chiplet Interconnect Express (UCIe)® defines an open standard that allows dies to communicate over various channels using various protocols. A standard may define one or more "link states" which identify a current state of a communication link. While a communication link may transition between various link states, there are latencies associated with such transitions.

For example, the UCIe® architecture supports various lower power management link states, such as "L1" and "L2" power management link states. When exiting the "L2" power management link state, the device must proceed through various states before reaching an "active" state. For instance, the device, in the "L2" state, does not save configuration values and proceeds through "reset," "sideband initialization," main-band initialization," "main-band training," and "link initialization" states before entering the "active" state, each of which include operations that take time and resources. As such, there are opportunities to address deficiencies within die interconnect architectures, such as the die architecture defined by the UCIe® standard.

SUMMARY

According to one aspect, a die comprises a physical layer configured to communicate with an adapter. The physical layer is further configured to detect a first event indicating a transition to a lower power state. The physical layer is also configured to transition to a first lower power state or a second lower power state based on a state control setting. Further, the physical layer is configured to, from the first lower power state, detect a second event indicating a transition to an active state, and transition to a reset state. The physical layer is also configured to, from the second lower power state, detect the second event indicating the transition to the active state, transition to a power stabilization state based on the second event, and remain in the power stabilization state for at least a threshold amount of time. The physical layer is further configured to transition to a training state from the power stabilization state after the threshold amount of time.

According to another aspect, a method by a die includes detecting, by a physical layer of the first die, a first event indicating a transition to a lower power state. The method also includes transitioning, by the physical layer, to a first lower power state or a second lower power state based on a state control setting. Further, from the first lower power state, the method includes detecting, by the physical layer, a second event indicating a transition to an active state, and transitioning, by the physical layer, to a reset state. From the second lower power state, the method includes detecting, by the physical layer, the second event indicating the transition to the active state, transitioning, by the physical layer, to a power stabilization state based on the second event, and remaining in the power stabilization state for at least a threshold amount of time.

According to yet another aspect, a die comprises a physical layer configured to communicate with an adapter. The physical layer is configured to detect a first event indicating a transition to a lower power state. The physical layer is also configured to transition to the lower power state based on the first event. Further, the physical layer is configured to detect a second event indicating a transition to an active state. In response to detecting the second event, the physical layer is configured to transition to a power stabilization state or a reset state based on a state control setting. The physical layer is also configured to, when in the power stabilization state, remain in the power stabilization state for at least a threshold amount of time, and transition to a training state from the power stabilization state after the threshold amount of time.

According to another aspect, a method by a die includes detecting, by a physical layer of the die, a first event indicating a transition to a lower power state. The method also includes transitioning, by the physical layer, to the lower power state based on the first event. Further, the method includes detecting a second event indicating a transition to an active state. In response to detecting the second event, the method includes transitioning, by the physical layer, to a power stabilization state or a reset state based on a state control setting. When in the power stabilization state, the method includes remaining in the power stabilization state for at least a threshold amount of time, and transitioning, by the physical layer, to a training state from the power stabilization state after the threshold amount of time.

According to another aspect, an apparatus comprises a die package that includes a first die and a second die communicatively coupled to the first die through an interconnect. Further, the first die comprises an adapter and a physical layer configured to communicate with the adapter. The physical layer is configured to receive a first signal from the adapter and, based on the first signal, transition from a first link state where the physical layer receives main power for main-band circuitry to a second link state where the physical layer receives auxiliary power for sideband circuitry. The physical layer is also configured to transmit, via the interconnect, a second signal to the second die, the second signal indicating the second link state. Further, the physical layer is configured to receive a third signal from the adapter and, based on the third signal, transition from the second link state to a power stabilization state. The physical layer is also configured to remain in the power stabilization state for at least a threshold amount of time. Further, the physical layer is configured to transition to a training state from the power stabilization state after the threshold amount of time.

BRIEF DESCRIPTION OF DRAWINGS

FIGS. 11A and 11B illustrate a prior art link state transition process.

DETAILED DESCRIPTION

Figure 1:
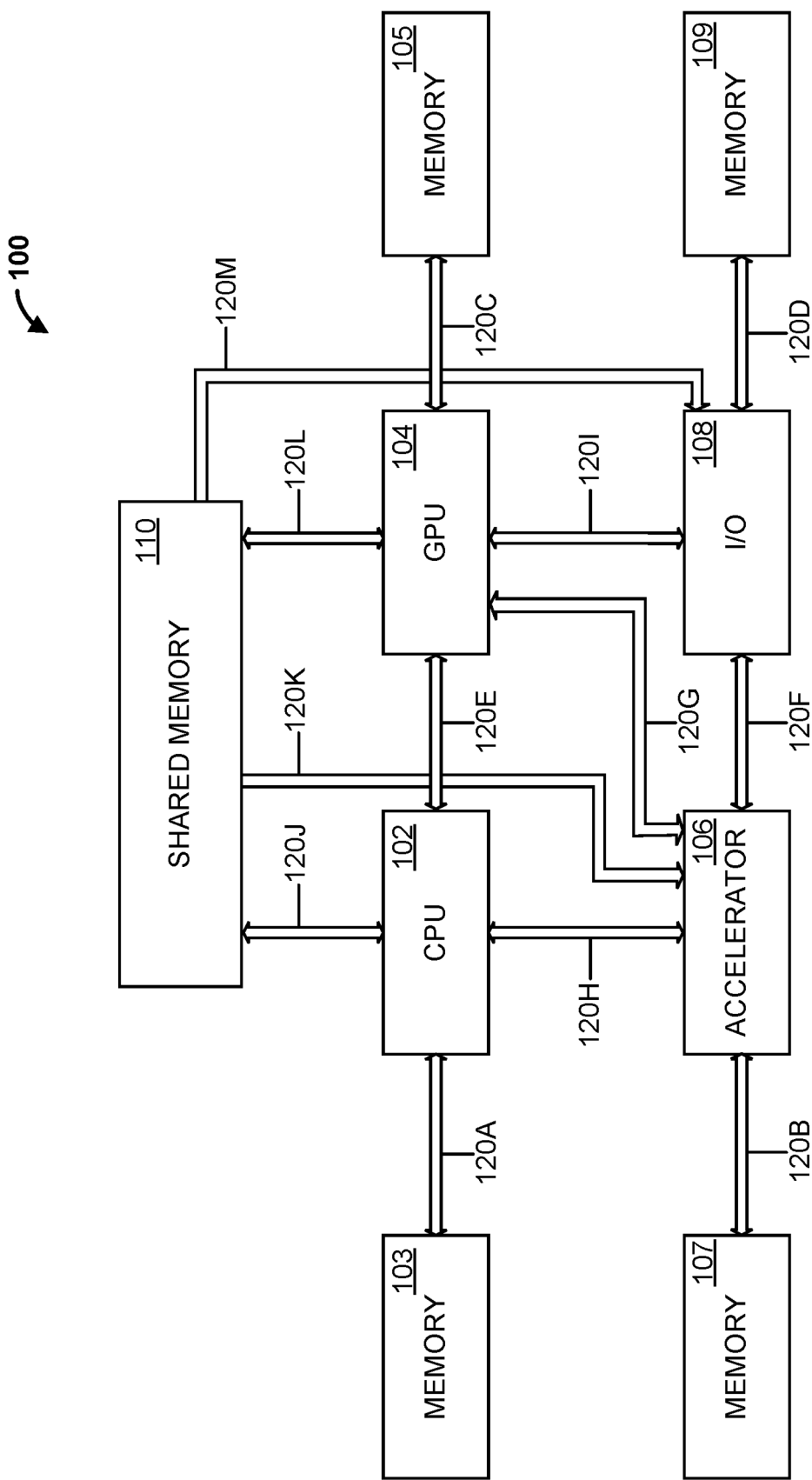
FIG. 1 is a block diagram of a die package, according to some implementations.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

The embodiments described herein are directed to reducing latencies when transitioning between link states in die-to-die interconnect architectures, such as the Universal Chiplet Interconnect Express (UCIe)® die-to-die interconnect architecture. For instance, UCIe® defines a layered protocol that includes a protocol layer, a die-to-die adapter (e.g., adapter layer), and a physical layer. The die-to-die adapter provides link state management and negotiation capabilities among others, while the physical layer controls electrical signaling, clocking, link training, and main-band and sideband communication channels, as well as other capabilities. Further, UCIe® architecture supports various protocols, such as Peripheral Component Interconnect Express (PCIe)®, Compute Express Link (CXL)®, and can support others through a supported streaming protocol. The UCIe® architecture supports various power management link states, such as "L1" and "L2" power management link states. For instance, the "L1" and "L2" link states are lower power states. In the "L1" state, the reference clock is disabled while main power and auxiliary power (e.g., "keep alive" power) are maintained to a device (e.g., die, chiplet), while in the "L2" state, main power is removed from the device while auxiliary power is maintained.

Figure 11A:
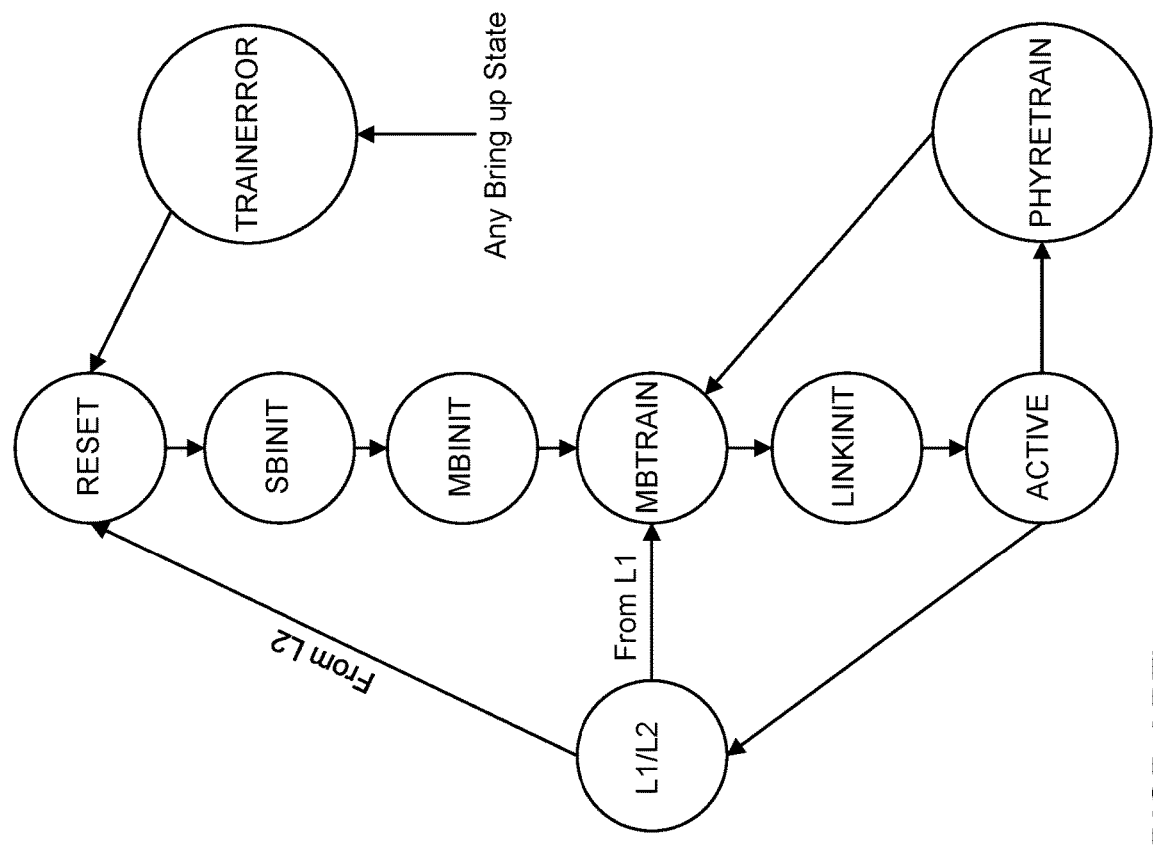

To transition from the L2 state to a fully operational state (e.g., the "ACTIVE" state), conventionally the device does not save configuration values in the L2 state, and must transition through various states including the RESET state, followed by the sideband initialization state (e.g., "SBINIT" state), the main-band initialization state (e.g., "MBINIT" state), the main-band training state (e.g., "MBTRAIN"), and the link initialization state (e.g., "LINKINIT" state). For example, FIG. 11A illustrates a conventional link state transition flow with link state definitions in FIG. 11B. Each of these link states, however, introduce latencies in reaching the fully operational state.

In some embodiments, rather than entering the L2 state (e.g., upon detecting an event indicating a transition to the L2 state), a device enters an "L2_Fast" state where main power is removed from a device while auxiliary power is maintained. For instance, the device may enter the L2_Fast state rather than the L2 state based on a control setting within UCIe® configuration space (e.g., L2_Fast state is enabled), as described herein. In some examples, the device determines whether to enter the L2 state or the L2_Fast state based on detecting a voltage level. For instance, the device may sense a voltage level provided to its input pin from a jumper or strap resistor. If the jumper or strap resistor is tied to a first voltage (e.g., ground), the device may enter the L2 state. If, however, the jumper or resistor is tied to an operating voltage (e.g., 1.2 Volts, 5 Volts, etc.), the device may enter the L2_Fast state. In other examples, the device determines whether to enter the L2 state or the L2_Fast state based on a detected event (e.g., based on an indication within a received command), as described herein. Upon entry to the L2_Fast state, the device reads one or more link configuration values, such as the current main-band clock configuration value, from one or more registers in UCIe® configuration space, and stores the read values in a memory that can maintain the values when main power is removed, such as within a register in non-volatile memory, or a register that receives auxiliary power. Main power to the device may then be removed.

When the device is to transition back to the fully operational state (e.g., upon detecting an event indicating a transition to the L0 state where main power is reapplied), the device enters a power stabilization state to allow, for example, for clock stabilization and calibration processes (e.g., due to main power being reapplied to the device). For instance, the power stabilization state may allow phase-locked loops (PLLs) used for clock generation to stabilize. In some examples, the device may enter the power stabilization state for a minimum amount of time, such as between 2 milliseconds and 10 milliseconds (e.g., 4 milliseconds). The device may then exit the power stabilization state (e.g., after the minimum amount of time has expired), and may configure the link, such as the main clock, based on the stored link configuration values (e.g., the main-band clock configuration value). The device may then proceed through the MBTRAIN and LINKINIT states to arrive at the ACTIVE state (e.g., "L0" state"). Thus, transitioning from the L2_Fast state to the ACTIVE state bypasses the RESET, SBINIT, MBINIT states, thereby avoiding latencies associated with these bypassed states.

In other embodiments, the device enters an enhanced L2 state (e.g., upon detecting the event indicating a transition to the L2 state) where main power is removed from the device while auxiliary power is maintained. Upon entry to the enhanced L2 state, the device may read one or more link configuration values, such as the current main-band clock configuration value, from a corresponding register in UCIe® configuration space, and may store the read values in memory, such as within a different register (e.g., a persistent register) in UCIe® configuration space. For instance, the device may proceed to read and store the link configuration values based on a control setting within UCIe® configuration space (e.g., and L2 exit control setting). In some examples, the device determines whether to read and store the link configuration values based on detecting a voltage level. In other examples, the device determines whether to read and store the link configuration values based on a detected event (e.g., based on an indication within a received command), as described herein.

When the device is to transition back to the fully operational state (e.g., upon detecting the event indicating a transition to the L0 state), the device may determine whether to proceed to the RESET state, or whether to enter a power stabilization state. For example, the device may determine whether to enter the RESET state or the power stabilization state based on a control setting. The control setting may be a register value within UCIe® configuration space, a detected voltage level, or based on a detected event (e.g., based on an indication within a received command), as described herein. When entering the power stabilization state, the device remains in the power stabilization state to allow, for example, for clock stabilization and calibration processes. In some examples, the device may enter the power stabilization state for a minimum amount of time, such as 4 milliseconds. The device may exit the power stabilization state after the minimum amount of time has passed. Further, the device may configure the registers in UCIe® configuration space by writing the corresponding stored values. For example, the device may read the current main-band clock configuration value from the register to which it was stored, and may write the current main-band clock configuration value to the corresponding main-band register to configure the main-band clock.

The device may then proceed through the MBTRAIN and LINKINIT states to arrive at the ACTIVE state. As such, when compared to conventional processes, transitioning from the enhanced L2 state back to the ACTIVE state bypasses the RESET, SBINIT, MBINIT states, thereby reducing latencies associated with the L2 state to ACTIVE state transition.

Among other advantages, the embodiments allow for a reduction in latencies associated with transitioning from a lower power state, such as the L2 state, back to a fully operations state, such as the ACTIVE state. In addition, additional power savings are achieved, as the power normally consumed during conventional link training procedures are avoided (e.g., by bypassing the RESET, SBINIT, and MBINIT UCIe® state). Furthermore, the lower latencies provided by the embodiments increase likelihoods of entering the L2_Fast or L2 states, thereby reducing power consumed during idle periods. Additionally, the embodiments may improve performance of transfers over communication links when transitioning from a lower power state, such as the L2 state, to a fully operational state, such as the L0 state, at least due to reduced latencies during state transitions. Persons of ordinary skill in the art having the benefit of the disclosures herein may recognize these and other advantages of the embodiments as well.

FIG. 1 is a block diagram of an integrated circuit package 100 (e.g., die package) that includes various dies (e.g., chiplets), such as central processing unit (CPU) die 102, graphical processing unit (GPU) die 104, accelerator die 106, and input/output (I/O) die 108. In addition, integrated circuit package 100 includes memory dies (e.g., random access memory (RAM) dies, read-only memory (ROM) dies, etc.), such as memory die 103, memory die 105, memory die 107, memory die 109, and shared memory 110. In some examples, one or more of the dies, such as shared memory 110, is a non-volatile memory device. In some examples, one or more of the dies, such as memory die 103, includes at least a portion of memory that is powered by auxiliary power supplied to integrated circuit package 100. Each of the various dies may be coupled to one or more other dies via interconnects 120. For example, CPU die 102 is coupled to memory die 103 via interconnect 120A, to GPU die 104 via interconnect 120E, to accelerator die 106 via interconnect 120H, and to shared memory 110 via interconnect 120J. GPU die 104 is further coupled to shared memory 110 via interconnect 120L, to memory die 105 via interconnect 120C, to accelerator die 106 via interconnect 120G, and to I/O die 108 via interconnect 120I. Accelerator die 106 is also coupled to memory die 107 via interconnect 120B, to shared memory 110 via interconnect 120K, and to I/O die 108 via interconnect 120F. I/O die 108 is further coupled to memory die 109 via interconnect 120D, and to shared memory 110 via interconnect 120M. Each of the interconnects 120 may be implemented as UCIe® interconnects, for example.

Integrated circuit package 100 is merely exemplary, and in other embodiments, an integrated circuit package may include any other suitable dies which may replace, or be added in addition to, any of the dies illustrated with respect to integrated circuit package 100. In addition, integrated circuit package 100 may be coupled to one or more other integrated circuit packages. For instance, a first integrated circuit package 100 may be coupled, over one or more interconnects 120, to a second integrated circuit package 100. These integrated circuit packages, including integrated circuit package 100, may be implemented in various types of devices, such as within networking devices, telecommunication devices, smartphone devices, gaming devices, enterprise devices, storage devices (e.g., cloud storage devices), and computing devices (e.g., cloud computing devices), among other types of devices.

In some embodiments, a die, such as CPU die 102, enters an L2_Fast state upon the occurrence of an event. For instance, CPU die 102 may enter the L2_Fast state upon receiving a signal from another die, such as accelerator die 106, upon the expiration of an inactivity timer (e.g., an L2 inactivity timer, etc.), or upon the occurrence of any other suitable event. In some examples, upon detecting the event, CPU die 102 determines whether to enter the L2 state, or the L2_Fast state, based on a configuration setting, such as a value stored in a register. In other examples, CPU die 102 determines whether to enter the L2 state or the L2_Fast state based on detecting a voltage level. For instance, CPU die 102 include an input pin that is tied, via a jumper or strap resistor, to a voltage level. CPU die 102 may determine the voltage level provided to its input pin. If the voltage level is within a first voltage range (e.g., less than 1.2 Volts), CPU die 102 enter the L2 state. If, however, the voltage level is within a second voltage range (e.g., 1.2 Volts or greater), CPU die 102 enters the L2_Fast state. In yet other examples, CPU die 102 determines whether to enter the L2 state or the L2_Fast state based on the detected event. For instance, the event may be a message (e.g., command) that indicates whether to enter the L2 state or the L2 Fast state.

In the L2_Fast state (e.g., as in the L2 state), main power is removed from CPU die 102 while auxiliary power is maintained. Upon entry to the L2_Fast state, CPU die 102 may read one or more link configuration values, such as the current main-band clock configuration value, from register configuration space (e.g., UCIe® configuration space), and may store the read values in memory, such as a register that operates on auxiliary power, or a register in non-volatile memory, such that the read values are maintained when main power is removed (e.g., a register within a non-volatile shared memory 110). The register may be located in the register configuration space, for example.

Upon detecting an indication to transition to a fully operational state (e.g., the ACTIVE state), CPU die 102 may enter a power stabilization state to allow, for example, for clock stabilization and calibration processes. In some examples, CPU die 102 enters the power stabilization state for a minimum amount of time. CPU die 102 may then exit the power stabilization state (e.g., after the minimum amount of time has expired), and may configure a communication link, such as by configuring a main clock, based on the stored link configuration values (e.g., the main-band clock configuration value). CPU die 102 may then proceed through link training and link initialization states, such as the MBTRAIN and LINKINIT states, to arrive at the fully operational state, such as the ACTIVE state. Thus, transitioning from the L2_Fast state to, for example, the ACTIVE state bypasses the RESET, SBINIT, MBINIT states, thereby reducing latencies associated with these bypassed states.

In other embodiments, CPU die 102 may, upon the occurrence of the event, enter an enhanced L2 state where, as noted herein, main power is removed from CPU die 102 while auxiliary power is maintained. Upon entry to the enhanced L2 state, CPU die 102 may read one or more link configuration values, such as the current main-band clock configuration value, from register configuration space (e.g., UCIe® configuration space), and may store the read values in memory, such as a register that operates on auxiliary power.

Upon detecting an event indicating to transition to a fully operational state (e.g., the ACTIVE state), CPU die 102 may enter either the RESET state, or a power stabilization state. For instance, CPU die 102 may proceed to enter the power stabilization state based on a configuration setting, such as a value stored in a register. For instance, the configuration setting may define whether CPU die 102 is to enter the RESET state, or the power stabilization state, upon exiting the L2 state. In other examples, CPU die 102 determines whether to enter the RESET state or the power stabilization state based on detecting a voltage level. For instance, CPU die 102 may include an input pin that is tied, via a jumper or strap resistor, to a voltage level. CPU die 102 may determine the voltage level provided to its input pin. If the voltage level is within a first voltage range (e.g., less than 1.2 Volts), CPU die 102 enters the RESET state. If, however, the voltage level is within a second voltage range (e.g., 1.2 Volts or greater), CPU die 102 enters the power stabilization state. In yet other examples, CPU die 102 determines whether to enter the RESET state or the power stabilization state based on the detected event. For instance, the event may be a message (e.g., command) that indicates whether to enter the RESET state or the power stabilization state.

In the case where CPU die 102 enters the power stabilization state, CPU die 102 may remain in the power stabilization state for a minimum amount of time, such as 4 milliseconds, to allow, for instance, one or more clocks to stabilize. CPU die 102 may then exit the power stabilization state (e.g., after the minimum amount of time has expired), and may configure a communication link, such as by configuring a clock for the link, based on the stored link configuration values (e.g., the main-band clock configuration value). CPU die 102 may then proceed through the MBTRAIN and LINKINIT states to arrive at the ACTIVE state. As such, when compared to conventional processes, transitioning from the enhanced L2 state back to the ACTIVE state bypasses the RESET, SBINIT, MBINIT states, thereby reducing latencies associated with these bypassed states.

Figure 2A:
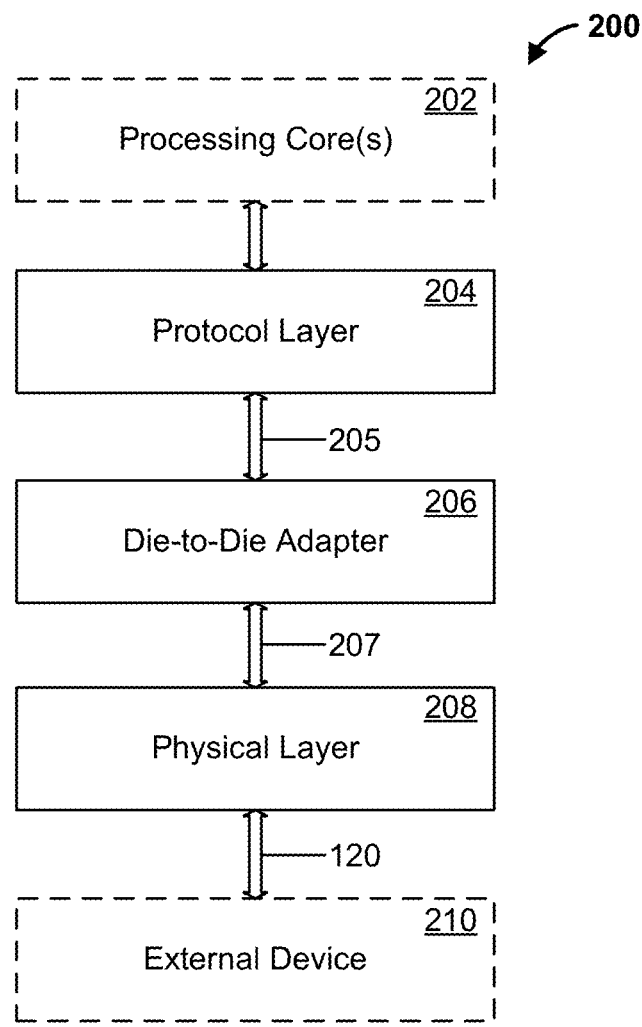
FIG. 2A is a block diagram of a layered protocol, according to some implementations.

FIG. 2A illustrates a layered protocol 200 that may be implemented by one or more of the dies of the integrated circuit package 100 of FIG. 1, such as CPU die 102. The layered protocol 200 may be one defined by a standard, such as the UCIe® standard. In this example, layered protocol 200 includes a protocol layer 204, a die-to-die adapter 206, and a physical layer 208. In accordance with the UCIe® standard, the die-to-die adapter 206 may perform link state management and parameter negotiation functions, among other functions as defined by the UCIe® standard. The physical layer 208 may perform link training, lane repair, lane reversal, scrambling/de-scrambling, main-band training, sideband training, and clock forwarding, among other functions. The protocol layer 204 may include the implementation of one or more protocols such as, for instance, any of the PCIe® or CXL® protocols. For instance, and as illustrated, one or more processing cores 202 executing instructions may implement the protocol layer 204.

Further, protocol layer 204 may couple to die-to-die adapter 206 via an interface 205. In some examples, interface 205 may be a flit-aware D2D interface (FDI). Die-to-die adapter 206 may also couple to the physical layer 208 via an interface 207 that may be, in some examples, a raw Die-to-Die interface (RDI). Further, die-to-die adapter 206 may signal requests to the physical layer 208 over interface 207. For instance, die-to-die adapter 206 may signal a request to physical layer 208 to enter the L2 state, or to exit the L2 state, using interface 227. In addition, protocol layer 204, die-to-die adapter 206, and physical layer 208 may operate to transmit and receive data over an interconnect 120 (e.g., a UCIe® data link). For instance, layered protocol 200 may be coupled to an external device 210 via the interconnect (e.g., data link) 120. The external device 210 may be, for instance, another of the dies of the integrated circuit package 100 of FIG. 1, or a die of another integrated circuit package. The physical layer 208 may receive data over the interconnect 120. For instance, the physical layer 208 may receive a request to exit the L2 state, from the external device 210.

Figure 2B:
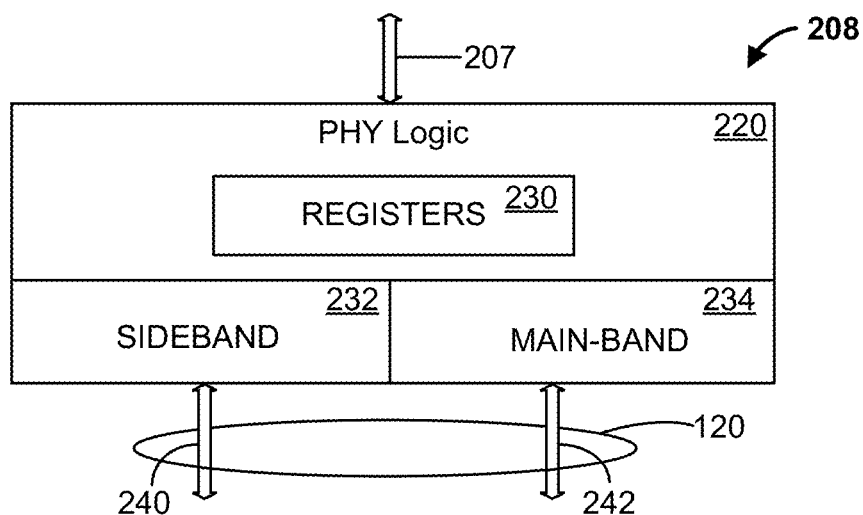
FIG. 2B is a block diagram illustrating circuitry that can implement the physical layer of FIG. 2A, according to some implementations.

FIG. 2B illustrates an example of physical layer 208. As illustrated, physical layer 208 may include physical logic 220 (e.g., physical layer circuitry) and communication channel circuitry including sideband circuitry 232 and main-band circuitry 234. Physical logic 220 may include any suitable physical layer circuitry to communicate over interface 207 with die-to-die adapter 206. In addition, sideband circuitry 232 may include any suitable circuitry to implement a sideband communication channel (e.g., UCIe® sideband channel), and main-band circuitry 234 may include any suitable circuitry to implement a main-band communication channel (e.g., UCIe® main-band channel).

Further, sideband circuitry 232 may operate on auxiliary power and includes a sideband connection 240 with a forwarded clock pin and a data pin for the input direction, and a forwarded clock pin and a data pin for the output direction. Main-band circuitry 234 operates on main power and includes a main-band connection 242 that includes a forwarded clock pin, a data valid pin, and a number of lanes (e.g., 16, 64, etc.) of data. As described herein, the physical layer 208 may couple to another device (e.g., die, chiplet) via interconnect 120, where interconnect 120 includes the sideband connection 240 and the main-ban connection 242. While main-band circuitry 234 operates on main power, sideband circuitry 232 operates on auxiliary power. As such, sideband circuitry 232 is operable even when main power is removed (e.g., shut off, disabled), such as when the physical layer 208 enters the L2 link state.

Figures 3A, 3B:
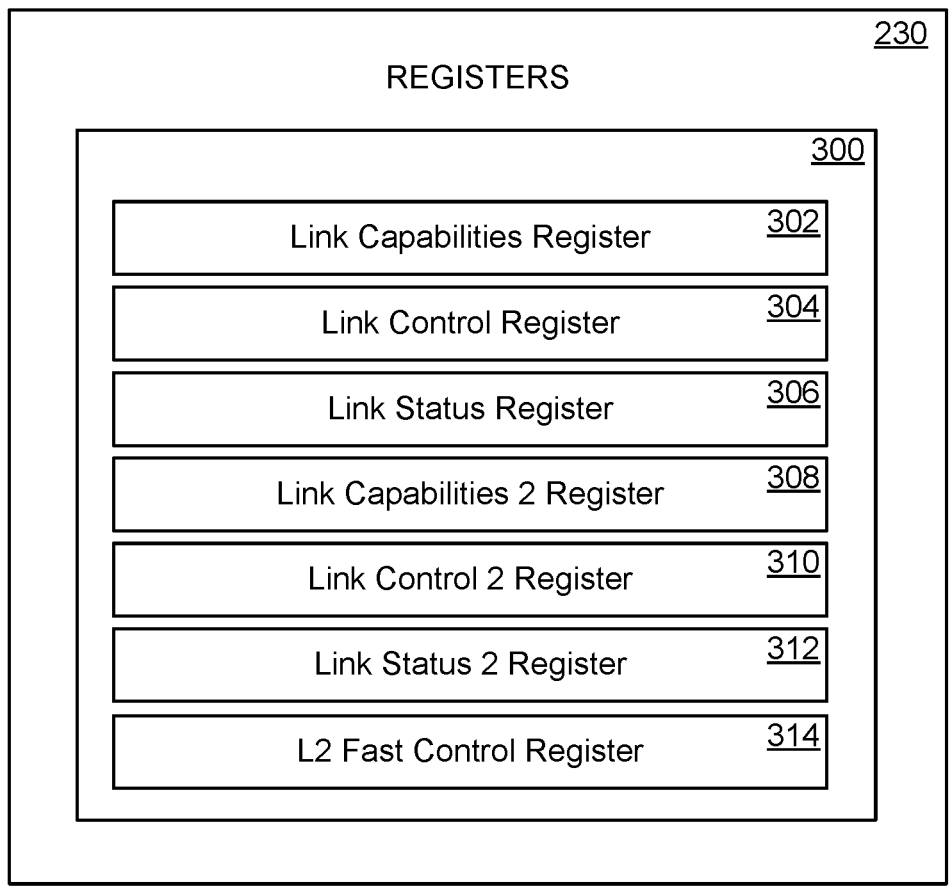
FIGS. 3A, 3B, 4A, 4B, 5A, and 5B are diagrams illustrating various link registers, according to some implementations.

As illustrated in FIG. 2B, physical logic 220 may also include registers 230, which may be mapped to a register configuration space, such as to UCIe® configuration space. Registers 230 may include, for example, any PCIe® and/or CXL® registers. Registers 230 may be configured (e.g., written to) during an initialization process, such as upon the loading and executing of instructions at device power-up. For instance, a processing core of CPU die 102 may, during a boot-up process, receive data, including executable instructions and configuration data, from a memory device, and may execute the instructions to configure one or more of the registers 230 based on the configuration data. In some examples, during an initialization process, such as during power-up, CPU die 102 executes instructions to read configuration data from non-volatile memory (e.g., memory 103, a memory device internal to physical logic 220), and configures one or more of the registers 230 based on the configuration data. As illustrated in FIG. 3A, registers 230 may include a link register set 300 in accordance with some embodiments. Link register set 300 may include a Link Capabilities Register 302, a Link Control Register 304, and a Link Status Register 306. Link register set 300 may also include a Link Capabilities 2 Register 308, a Link Control Register 310, and a Link Status Register 312. Each of these registers may function in accordance with the UCIe® standard, for instance.

Link register set 300 further includes an L2 Fast Control Register 314 that can configure whether the L2_Fast state is enabled, and an inactivity timer associated with the L2_Fast state. For instance, as illustrated in FIG. 3B, the L2 Fast Control Register 314 may include at least eight bits. In this example, bit zero may define whether L2 Fast is enabled. For instance, a value of "1" may indicate that the L2_Fast state is enabled, while a value of "0" may indicate that the L2_Fast state is not enabled. As described herein, in some examples, upon detecting an event, a die (e.g., CPU die 102) may determine whether to enter the L2 state, or the L2_Fast state, based on a configuration setting, such as bit zero of the L2 Fast Control Register 314. For example, CPU die 102 may enter the L2_Fast state if bit zero of the L2 Fast Control Register 314 is set to "1." Otherwise, CPU die 102 may enter the conventional L2 state (e.g., bit zero of the L2 Fast Control Register 314 is set to "0").

The L2 Fast Control Register 314 also defines an L2 fast inactivity timer in bits three through one. The L2 fast inactivity timer may operate in accordance with a particular protocol (e.g., PCIe®), and by default may be set to the L2 inactivity timer defined, for instance, in a protocol stack space, such as within a PCIe/CXL protocol stack. As described herein, upon expiration of the L2 fast inactivity timer, physical logic 220 may determine whether to enter the L2 state, or the L2 fast state. In this example, bits seven through four are reserved (e.g., unused but reserved for future use). In some instances, one or more of bits seven through four define a minimum amount of time that physical logic 220 must remain in the L2_Fast state as described herein.

Figures 4A, 4B:
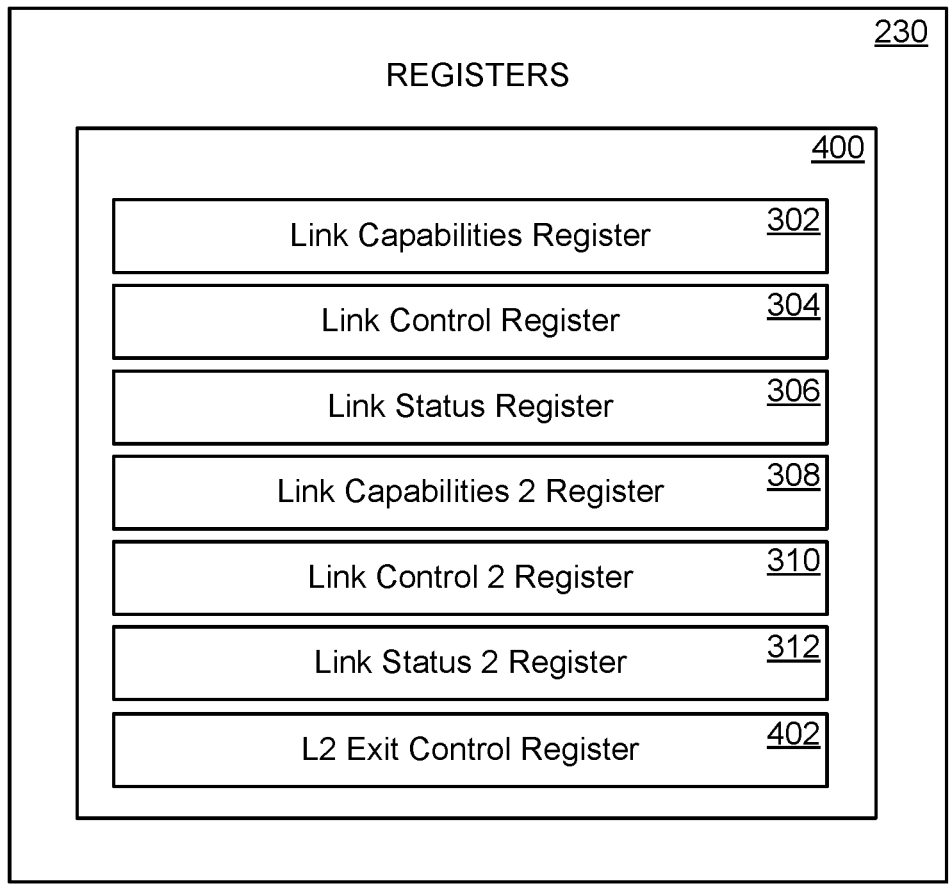

FIG. 4A illustrates a link register set 400 which may be included within registers 230 in accordance with some embodiments. As with link register set 300, link register set 400 may include a Link Capabilities Register 302, a Link Control Register 304, a Link Status Register 306, a Link Capabilities 2 Register 308, a Link Control Register 310, and a Link Status Register 312.

Link register set 400 may also include an L2 Exit Control Register 402 that can configure whether to proceed to a RESET state, or a power stabilization state, when exiting the L2 state. For instance, as illustrated in FIG. 4B, the L2 Exit Control Register 402 may include at least eight bits. In this example, bit zero may define how to proceed with exiting the L2 state. For instance, a value of "1" may indicate to proceed to the power stabilization state when exiting the L2 state, while a value of "0" may indicate to proceed to the RESET state when exiting the L2 state.

As described herein, in some examples, the die (e.g., CPU die 102) receives an indication to transition to a fully operational state (e.g., the ACTIVE state) from the L2 state, and determines whether to proceed to the power stabilization state, or to proceed to the RESET state. For example, CPU die 102 may enter the power stabilization state if bit zero of the L2 Exit Control Register 402 is set to "1." Otherwise, CPU die 102 may enter the RESET state (e.g., bit zero of the L2 Exit Control Register 402 is set to "0").

Figure 5A:
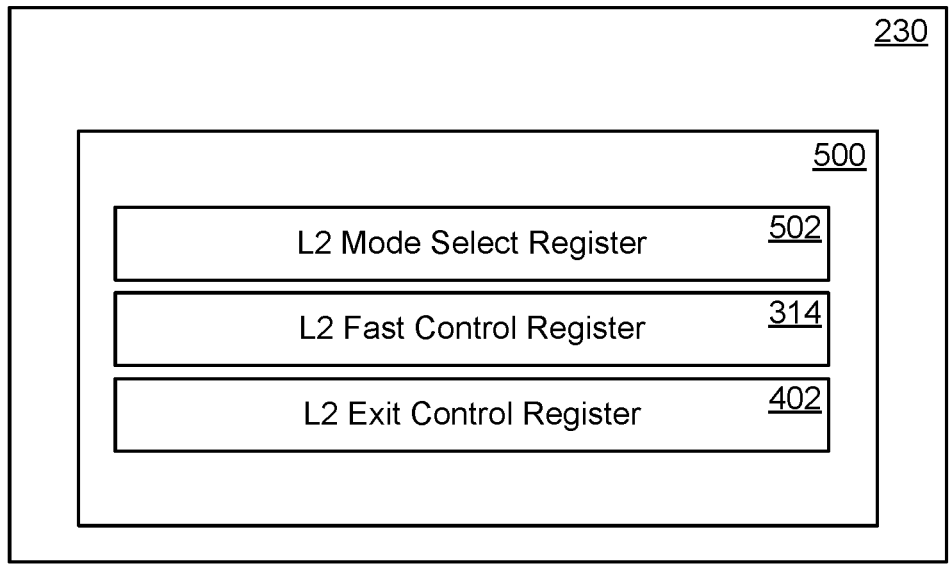
Figure 5B:
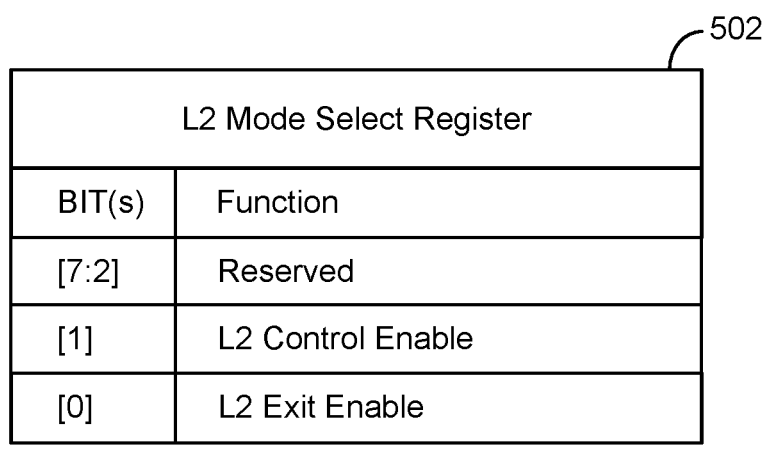

In some examples, registers 230 may include a link register set 500 as illustrated in FIG. 5A. Link register set 500 may include an L2 Mode Select Register 502, as well as the L2 Fast Control Register 314 and the L2 Exit Control Register 402. The L2 Mode Select Register 502 may define whether each of the L2 Fast Control Register 314 and the L2 Exit Control Register 402 are enabled. For example, as illustrated in FIG. 5B, the L2 Mode Select Register 502 includes bit 1 that defines whether the L2 Fast Control Register 314 is enabled, and a bit 0 that defines whether the L2 Exit Control Register 402 is enabled.

For instance, when bit 1 of the L2 Mode Select Register 502 is set to "1," the L2 Fast Control Register 314 is operational (e.g., the various bits may be set or cleared). If bit 1 of the L2 Mode Select Register 502 is set to "0," however, the L2 Fast Control Register 314 is not operational (e.g., the various bits cannot be written to), and the corresponding die cannot enable the L2_Fast state. Similarly, when bit 0 of the L2 Mode Select Register 502 is set to "1," the L2 Exit Control Register 402 is operational. If bit 0 of the L2 Mode Select Register 502 is set to "0," however, the L2 Exit Control Register 402 is not operational (e.g., the various bits cannot be written to), and the corresponding die cannot proceed from the L2 state to the power stabilization state as described herein.

Figure 6:
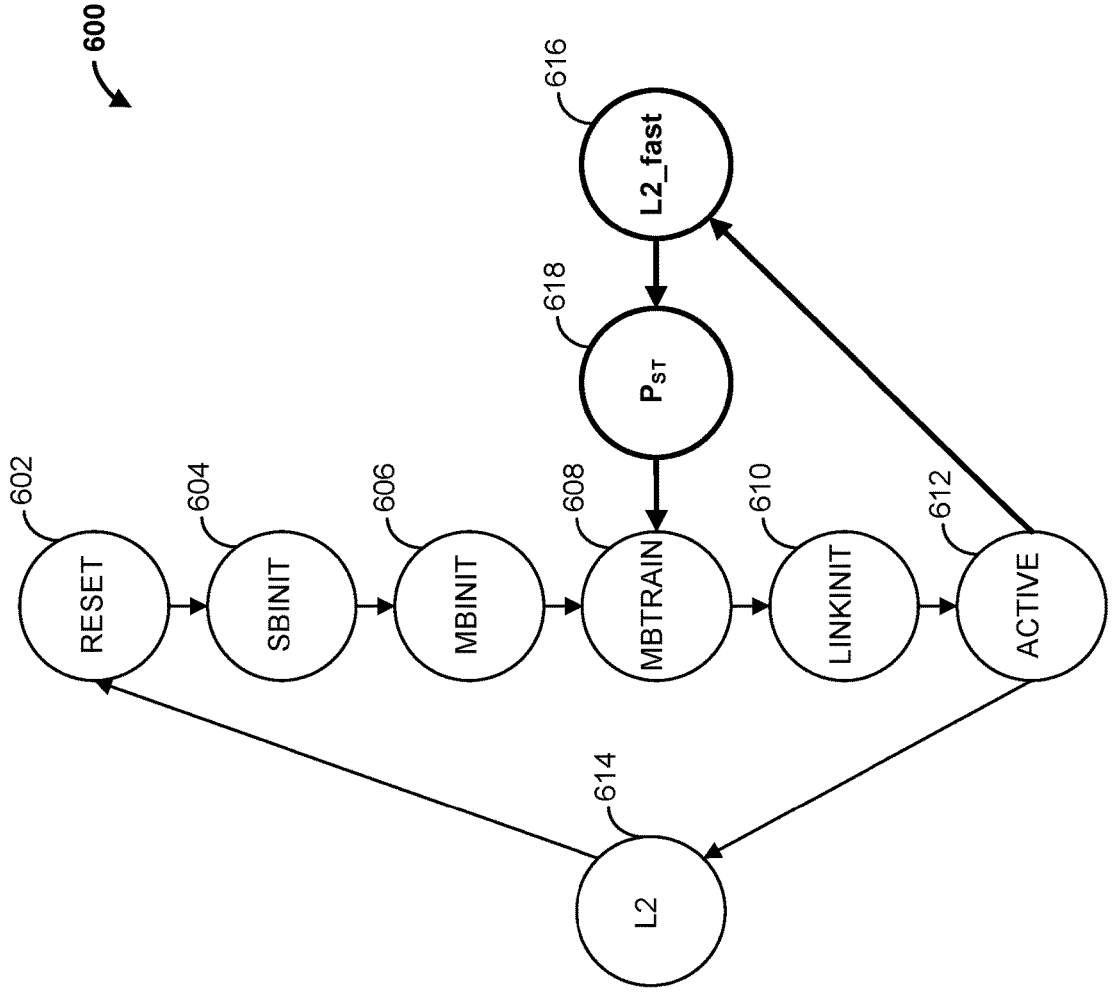
FIG. 6 illustrates an exemplary link transition state machine, according to some implementations.

FIG. 6 illustrates a link transition state machine 600 that may be implemented by physical layer circuitry of a die (e.g., chiplet), such as physical logic 220 of CPU die 102. Link transition state machine 600 begins in a RESET state 602 that can follow from a primary reset of the physical layer circuitry, or following the TRAINERROR state or L2 state. To exit the RESET state, one or more requirements may need to be satisfied. For example, in some instances, power supplies must be stable, sideband clocks must be available and running at a particular rate, and main-band and die-to-die adapter clocks must be stable and available. In some instances, a physical layer (e.g., physical layer 208) must stay in the RESET state for a minimum of 4 milliseconds to allow PLLs to stabilize. Additional requirements to exit the RESET state may include a requirement that the main-band clock is set to a slowest I/O data rate, that link training has occurred, and that the Physical Layer (e.g., physical layer 208) is not kept in RESET.

Once any requirements are satisfied, the link transition state machine 600 may transition from the RESET state 602 to the SBINIT (i.e., sideband initialization) state 604 where the sideband (e.g., sideband circuitry 232) is initialized and, in some instances, repaired. From the SBINIT state 604, the link transition state machine 600 proceeds to the MBINIT (i.e., main-band initialization) state 606 where main-band link training processes are performed. For instance, operation speed may be established, and clock to data centering may be performed. In some examples, additional calibrations may be performed such as clock correction and transmit and receive dew-skew processes. These link training processes may be performed at a lowest main-band clock speed.

From the MBINIT state 606, the link transition state machine 600 may enter the MBTRAIN (i.e., main-band training) state 608. During this state, main-band link training processes are performed. For instance, main-band operational speed may be established, and clock to data centering processes may be performed. In some instances, additional calibrations may be performed such as receive clock correction, and transmit and receive dew-skew processes.

Once the MBTRAIN state 608 processes are complete, the link transition state machine 600 may transition to the LINKINIT (link initialization) state 610 where link initialization processes are performed. For example, the LINKINIT state 610 allows the die-to-die adapter (e.g., die-to-die adapter 206) to complete initial link management processes, before entering the ACTIVE state on the interface (e.g., interface 207) to the physical layer (e.g., physical layer 208). Further, and following completion of the processes during the LINKINIT state 610, the link transition state machine 600 may enter the ACTIVE state 612. In the ACTIVE state 612, physical layer initialization is complete. As such, when in the ACTIVE state 612, a die, such as CPU die 102, can enhance data packets with another die, such as GPU die 104.

In this example, from the ACTIVE state 612, the link transition state machine 600 may transition to either the L2 state 614, or the L2_Fast state 616 upon the occurrence of an event (e.g., upon the expiration of an inactivity time, such as the L2 fast inactivity timer, when the die-to-die adapter signals a transition to the L2 state, etc.). For example, the link transition state machine 600 may detect the event, and in response may determine whether to transition to the L2 state 614, or the L2_Fast state 616, based on a register value. For instance, the link transition state machine 600 may proceed from the ACTIVE state 612 to the L2 state 614 if bit zero of the L2 Fast Control Register 314 is set to a value of "0." Alternatively, if bit zero of the L2 Fast Control Register 314 is set to a value of "1," the link transition state machine 600 may proceed from the ACTIVE state 612 to the L2 Fast state 616. In some examples, upon detecting the event, the link transition state machine 600 determines whether to enter the L2 state 614, or the L2 Fast state 616, based on detecting a voltage level. In yet other examples, CPU die 102 determines whether to enter the L2 state 614 or the L2_Fast state 616 based on the detected event. For instance, the event may be a message (e.g., command) that indicates whether to enter the L2 state 614 or the L2 Fast state 616.

If the link transition state machine 600 proceeds to the L2 state 614, the link transition state machine 600 may remain in the L2 state 614 until main power is provided. For instance, the link transition state machine 600 may proceed from the ACTIVE state 612 to the L2 state 614 if bit zero of the L2 Fast Control Register 314 is set to a value of "0." In this transition, the device does not have to save the configuration value. The power can be removed from the device relatively quickly. However, upon receiving an indication to transition to the ACTIVE state 612 (e.g., when the die-to-die adapter requests the ACTIVE state, when a remote die requests an L2 exit, etc.), more steps need to be taken to reach the ACTIVE state, as described herein. Referring back to FIG. 6, once main power is reapplied, the link transition state machine 600 may proceed back to the RESET state 602.

Alternatively, the link transition state machine 600 may proceed from the ACTIVE state 612 to the L2_Fast state 616. For instance, the link transition state machine 600 may transition to the L2_Fast state 616 if bit zero of the L2 Fast Control Register 314 is set to a value of "1." If the link transition state machine 600 proceeds to the L2_Fast state 616, as described herein, the link transition state machine 600 may read one or more link configuration values, such as a current main-band clock configuration value, from register configuration space (e.g., UCIe® configuration space), and the read values may be stored in a memory that will maintain the values, such as within a register that operates on auxiliary power, or a register maintained within non-volatile memory, before main power (e.g., to the physical logic 220) is removed.

Upon receiving an indication to transition to the ACTIVE state 612 (e.g., when the die-to-die adapter requests the ACTIVE state, when a remote die requests an L2_Fast exit, etc.), the link transition state machine 600 enters the power stabilization ($P_{ST}$) state 618. In some examples, the link transition state machine 600 remains in the $P_{ST}$ state 618 for a minimum amount of time to allow, for example, clock-associated PLLs to stabilize. For instance, the $P_{ST}$ state 618 may allow phase-locked loops (PLLs) used for clock generation to stabilize. In some examples, a minimum time value characterizing a minimum amount of time may be stored in a register, such as within bits of the L2 Fast Control Register 314. The bits of the register may control the minimum amount of time that the link transition state machine 600 remains in the $P_{ST}$ state 618. For instance, upon entering $P_{ST}$ state 618, the link transition state machine 600 may establish (e.g., initialize) a timer based on the minimum time value, and may initiate (e.g., start) the timer. Once the timer expires, the link transition state machine 600 may configure the register configuration space by writing to one or more registers the corresponding stored values. For example, the device may read the current main-band clock configuration value from the register to which it was stored, and may write the current main-band clock configuration value to the corresponding main-band register to configure the main-band clock.

The link transition state machine 600 may then proceed to exit the $P_{ST}$ state 618 (e.g., assuming other processes are complete). The link transition state machine 600 may transition to the MBTRAIN state 608 after exiting the $P_{ST}$ state 618, thereby bypassing the RESET state 602, SBINIT state 604, and MBINIT state 606. As such, the link transition state machine 600 avoids latencies associated with these bypassed states.

Figure 7:
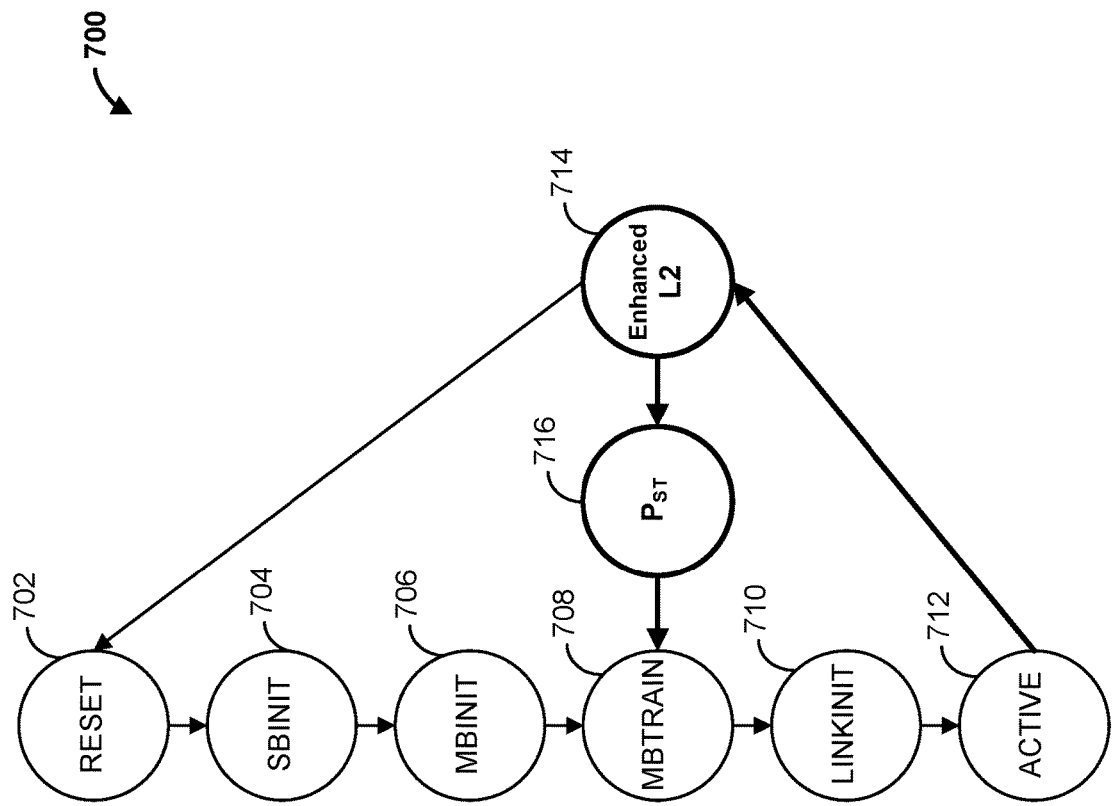
FIG. 7 illustrates another exemplary link transition state machine, according to some implementations.

FIG. 7 illustrates a link transition state machine 700 that can be implemented, for example, by the physical logic of a die, such as the physical logic 220 of CPU die 102. Link transition state machine 700 begins at RESET state 702 which can follow from a primary reset of the physical layer circuitry, from a TRAINERROR state, or from the enhanced L2 state 714 as further described below. Link transition state machine 700 may exit the RESET state 702 once one or more requirements are satisfied, as described herein.

Once any requirements are satisfied, the link transition state machine 700 may transition from the RESET state 702 to the SBINIT state 704 where the sideband (e.g., sideband circuitry 232) is initialized and, in some instances, repaired. From the SBINIT state 704, the link transition state machine 700 proceeds to the MBINIT state 706 where main-band link training processes are performed, in some examples at a lowest main-band clock speed.

From the MBINIT state 706, the link transition state machine 700 enters the MBTRAIN state 708 where main-band link training processes are performed. Once the MBTRAIN state 708 processes are complete, the link transition state machine 700 may transition to the LINKINIT state 710 where link initialization processes are performed. Further, and following completion of the processes during the LINKINIT state 710, the link transition state machine 700 may enter the ACTIVE state 712 where physical layer initialization is complete.

In this example, from the ACTIVE state 712, the link transition state machine 700 may transition to the enhanced L2 state 714 upon the occurrence of an event (e.g., upon receiving a signal from another die, upon the expiration of an activity timer, etc.). As noted herein, in the enhanced L2 state 714, main power is removed from the physical circuitry while auxiliary power is maintained. As such, the main-band communication channel (e.g., main-band circuitry 234) is not powered, while the side-band channel (e.g., sideband circuitry 232) is powered. Upon entry to the enhanced L2 state 714, the link transition state machine 700 may read one or more link configuration values, such as the current main-band clock configuration value, from register configuration space (e.g., UCIe® configuration space), and may store the read values in memory, such as a register that operates on auxiliary power.

Upon detecting an event indicating to transition to a fully operational state (e.g., the ACTIVE state 712), the link transition state machine 700 may enter either the RESET state 702, or a power stabilization ($P_{ST}$) state 716. For example, the link transition state machine 700 may determine whether to proceed to the RESET state 702, or the $P_{ST}$ state 716, based on a register value such as, for instance, a value within the L2 Exit Control Register 402 that was set during an initialization process (e.g., a boot-up process). For instance, the link transition state machine 700 may proceed from the enhanced L2 state 714 to the RESET state 702 if bit zero of the L2 Exit Control Register 402 is set to a value of "0." Alternatively, if bit zero of the L2 Exit Control Register 402 is set to a value of "1," the link transition state machine 700 may proceed from the enhanced L2 state 714 to the $P_{ST}$ state 716. In some examples, the link transition state machine 700 determines whether to enter the RESET state 702, or the $P_{ST}$ state 716, based on detecting a voltage level. In yet other examples, the link transition state machine 700 determines whether to enter the RESET state 702, or the $P_{ST}$ state 716, based on the detected event. For instance, the event may be a message (e.g., command) that indicates whether to enter the RESET state 702 or the $P_{ST}$ state 716 from the enhanced L2 state 714.

If the link transition state machine 700 proceeds to the $P_{ST}$ state 716, the link transition state machine 700 may remain in $P_{ST}$ state 716 for a minimum amount of time to allow, for instance, one or more clock-associated PLLs to stabilize. A minimum time value characterizing the minimum amount of time may be stored in a register, such as within bits of the L2 Exit Control Register 402. The bits of the register may control the minimum amount of time that the link transition state machine 700 remains in the $P_{ST}$ state 716. For instance, upon entering $P_{ST}$ state 716, the link transition state machine 700 may establish a timer based on the minimum time value, and may initiate the timer.

Once the timer expires, the link transition state machine 700 may configure the register configuration space by writing the previously stored values to one or corresponding registers. For example, the device may read the current main-band clock configuration value from the register to which it was stored, and may write the current main-band clock configuration value to the corresponding main-band register to configure the main-band clock. The link transition state machine 700 may then exit the $P_{ST}$ state 716 (e.g., assuming other processes are complete) and proceed back to the MBTRAIN state 708.

As such, when the link transition state machine 700 proceeds from the enhanced L2 state 714 to the $P_{ST}$ state 716, the RESET state 702, SBINIT state 704, and MBINIT state 706 are bypassed, thereby avoiding latencies associated with these bypassed states.

In some embodiments, physical logic, such as physical logic 220, is configured to enable one or both of the link transition state machine 600 and the link transition state machine 700. The physical logic may include link register set 500, including L2 Mode Select Register 502, that allows, for example, the enabling of at least one of the link transition state machine 600 and the link transition state machine 700.

Figure 8:
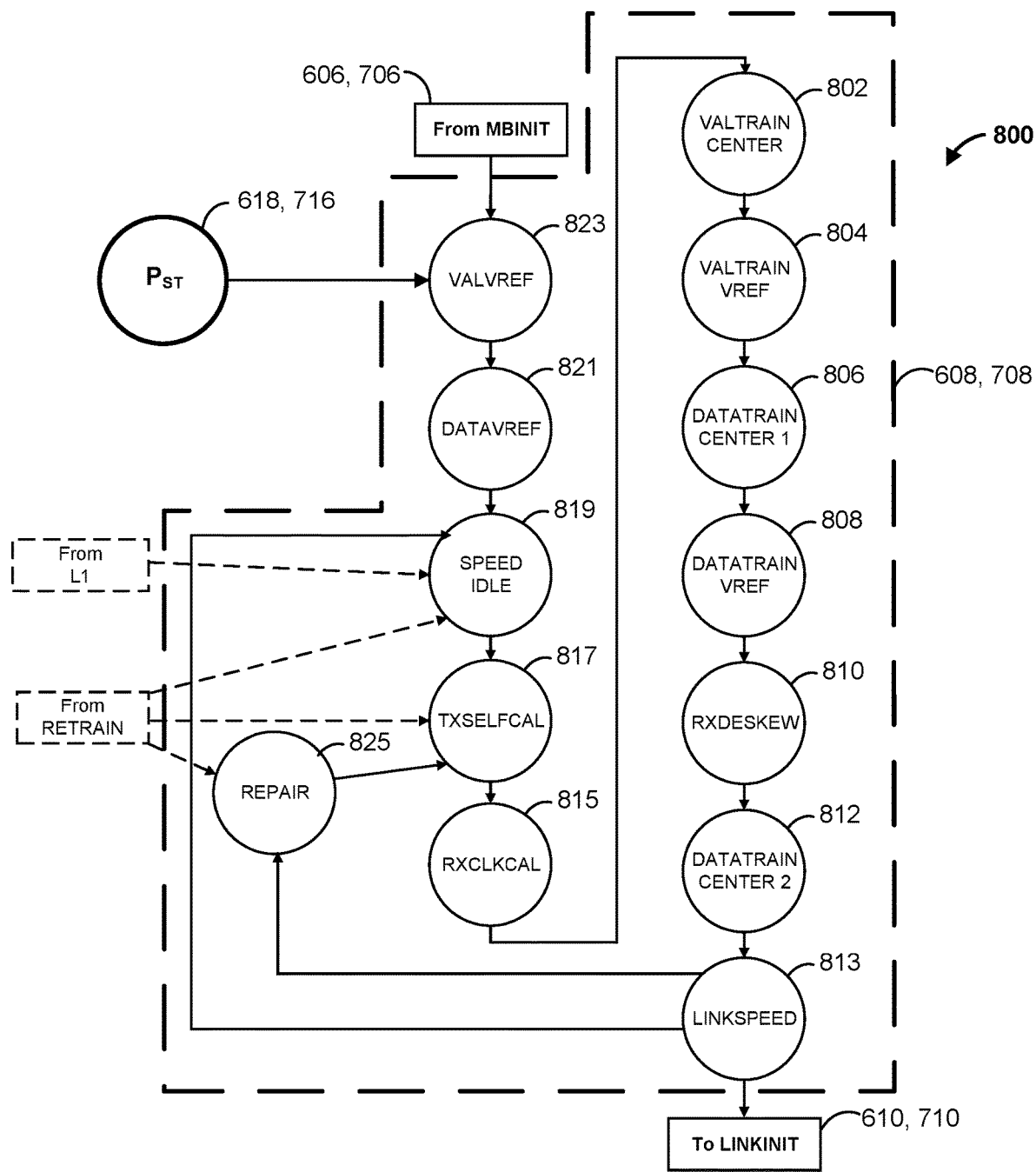
FIG. 8 illustrates an exemplary main-band link training state machine, according to some implementations.

For instance, FIG. 8 illustrates a link transition state machine 800 that can be implemented, for example, by the physical logic of a die, such as the physical logic 220 of CPU die 102. In particular, link transition state machine 800 illustrates sub-states of the MBTRAIN state 608 and MBTRAIN state 708 of FIGS. 6 and 7, respectively. In this example, the sub-states include the valid voltage reference (VALVREF) state 823, data voltage reference (DATAVREF) state 821, SPEED IDLE state 819, transmitter calibration (TXSELFCAL) state 817, receive clock calibration (RXCLKCAL) state 815, valid to clock training (VALTRAINCENTER) state 802, valid train voltage reference (VALTRAINVREF) state 804, data to clock training (DATATRAINCENTER1) state 806, valid data voltage reference (DATATRAINVREF) state 808, receiver deskew (RXDESKEW) state 810, data to clock training (DATATRAINCENTER2) state 812, link speed (LINKSPEED) state 813, and the repair (REPAIR) state 825. These sub-states may correspond to the Main-Band Training states for the UCIe* standard.

As illustrated, link transition state machine 800 may transition to the MBTRAIN 608, 708 states from the MBINIT states 606, 706, respectively. Further, and when bypassing the RESET, SBINIT, and MBINIT states, the link transition state machine 800 may transition to the MBTRAIN 608, 708 states from the $P_{ST}$ states 618, 716, respectively. From the MBINIT states 606, 706, the link transition state machine 800 may transition to the LINKINIT state 610, 710, respectively.

Figure 9:
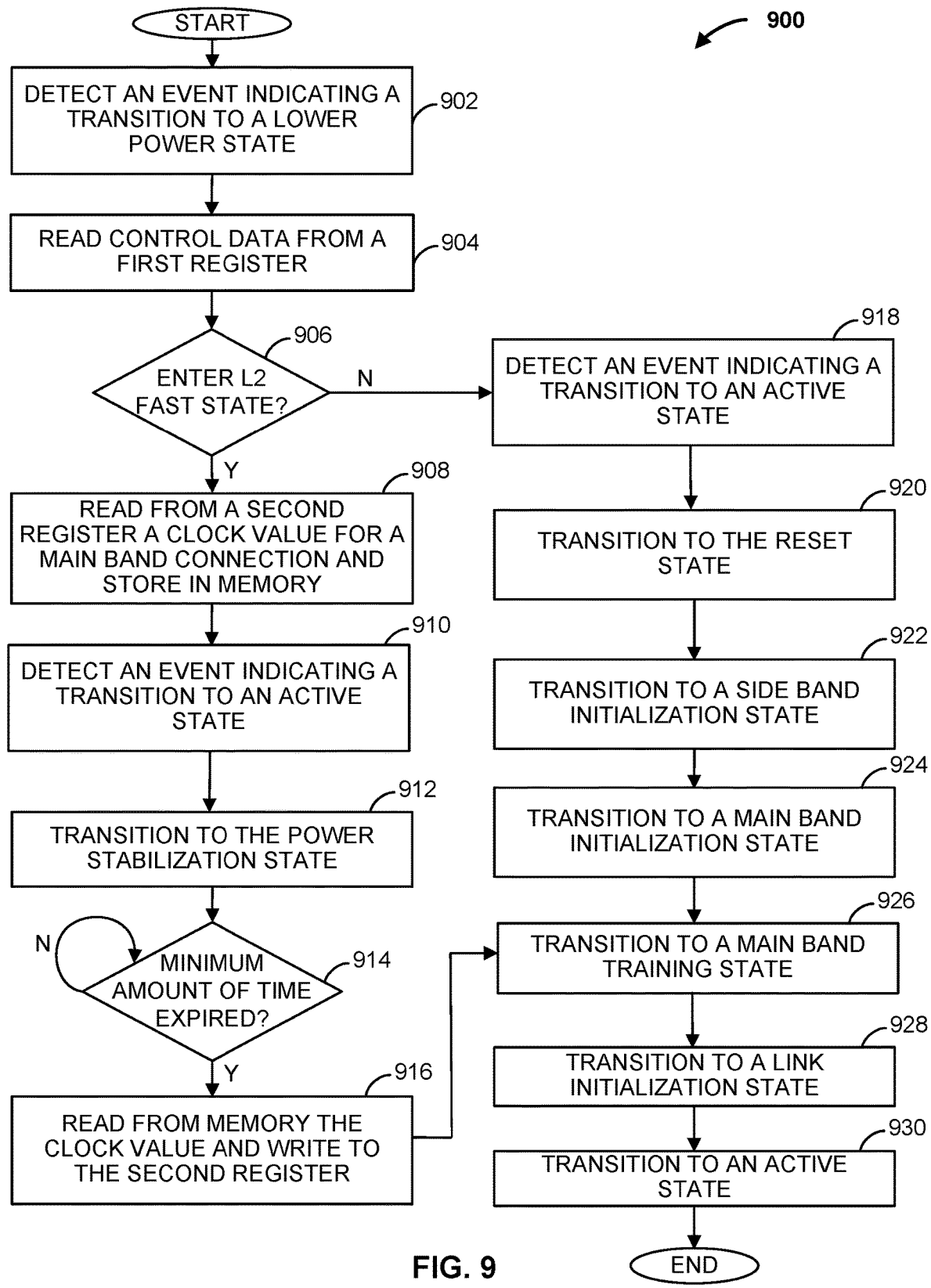
FIG. 9 is a flowchart of an exemplary process for transitioning a die between link states, according to some implementations.

FIG. 9 is a flowchart of an exemplary process 900 for transitioning a die between link states, in accordance with some embodiments. Exemplary process 900 may be carried out by a physical layer of a die, such as the physical logic 220 of CPU die 102. Beginning at block 902, an event is detected that indicates a transition to a lower power state. For example, physical logic 220 may receive a signal indicating a transition from an "L0" state to an "L2" state. At block 904, in response to the detection, control data is read from a first register. For instance, physical logic 220 may read an L2 Fast Control Register 314 from register configuration space. As described herein, the L2 Fast Control Register 314 includes an L2 Fast Enable bit indicating whether L2_Fast is enabled.

Proceeding to block 906, the physical logic 220 determines, based on the control data, whether to enter the L2 state or, alternatively, the L2 Fast state. For example, the physical logic 220 may determine whether bit zero of the data read from the L2 Fast Control Register 314 is set (e.g., "1") indicating that "Fast Resume" is enabled, or clear (e.g., "0") indicating that "Fast Resume" is not enabled. If "Fast Resume" is not enabled, the process 900 enters the L2 state by proceeding to block 918 (e.g., L2 state 614). In some examples, upon detecting the event, the physical logic 220 determines whether to enter the L2 state, or the L2_Fast state, based on detecting a voltage level. In yet other examples, the physical logic 220 determines whether to enter the L2 state or the L2_Fast state based on the detected event. For instance, the event may be a message (e.g., command) that indicates whether to enter the L2 state or the L2 Fast state.

Further, at block 918, the physical logic 220 detects an event indicating a transition from the L2 state to the ACTIVE state. For instance, physical logic 220 may receive a signal from the die-to-die adapter 206 to exit the L2 state. Alternatively, the physical logic 220 may receive a signal from another die requesting an exit from the L2 state. Based on detecting the detecting the event, the method proceeds to block 920 where the physical logic 220 transitions to the RESET state (e.g., RESET state 602) to complete reset process, such as the reset processes described herein.

From block 920, the method proceeds to block 922, where the physical logic 220 transitions to a sideband initialization state (e.g., SBINIT state 604) to perform sideband initialization processes. Once complete with the sideband initialization processes, the method proceeds to block 924, where the physical logic 220 transitions to the main-band initialization state (e.g., MBINIT state 606) and completes main-band initialization processes. The method then proceeds to block 926, where the physical logic 220 transitions to the main-band training state (e.g., MBTRAIN state 608) to complete main-band training processes.

Back at block 906, if the physical logic 220 determines that "Fast Resume" is enabled, the method enters the L2_Fast state by proceeding to block 908 (e.g., L2_Fast state 616). At block 908, the physical logic 220 reads from a second register, such as one located in register configuration space, a clock value for a main-band connection. For instance, physical logic 220 may read from the second register a main-band clock value characterizing a main-band clock achieved after a previous I/O rate negotiation process (e.g., negotiated during the last LINKINIT state 610). Further, the physical logic 220 may store the read value within memory, such as within a register that operates on auxiliary power (e.g., rather than, or in addition to, main power).

From block 908 the method proceeds to block 910. At block 910, the physical logic 220 detects an event indicating a transition to an active state (e.g., ACTIVE state 612). For instance, the physical logic 220 may receive a signal from the die-to-die adapter (e.g., die-to-die adapter 206) requesting the ACTIVE state on the RDI interface, or may receive a signal from a remote link partner (e.g., GPU die 104) requesting an L2 state exit. Based on the detected event, the method proceeds to block 912, where the physical logic 220 transitions from the L2_Fast state to the power stabilization state (e.g., $P_{ST}$ state 618).

Proceeding to block 914, and during the power stabilization state, the physical logic 220 may determine whether a minimum amount of time has expired. For instance, physical logic 220 may establish a time of at least 4 milliseconds, and may remain in the power stabilization state until the time expires. The amount of time may correspond to an amount of time (e.g., a maximum amount of time) that one or more clocks, such as the main-band clock, require to stabilize. Once the amount of time has passed, the method proceeds to block 916.

At block 916, the physical logic 220 reads from the memory the clock value stored (i.e., the clock value stored at block 908). The physical logic 220 then writes the read clock value back to the second register. As such, physical logic 220 configures the corresponding clock (e.g., the main-band connection clock) to operate in accordance with how the clock was configured as a result of the previous rate negotiation process. From block 916, the method proceeds to block 926, where the physical logic 220 transitions to the main-band training state to complete main-band training processes (e.g., MBTRAIN state 608).

Once the physical logic 220 completes the main-band training processes at block 926, the method proceeds to block 928 where the physical logic 220 transitions to a link initialization state (e.g., LINKINIT state 610). During the link initialization state the physical logic 220 completes link initialization processes as described herein. The method then proceeds to block 930 where the physical logic 220 transitions to the active state (e.g., ACTIVE state 612). During the active state, the sideband channel and the main-band channel are fully operative in at least some examples. Process 900 may repeat, for example, upon the detection of an additional event indicating a transition back to the lower power state at block 902.

Figure 10:
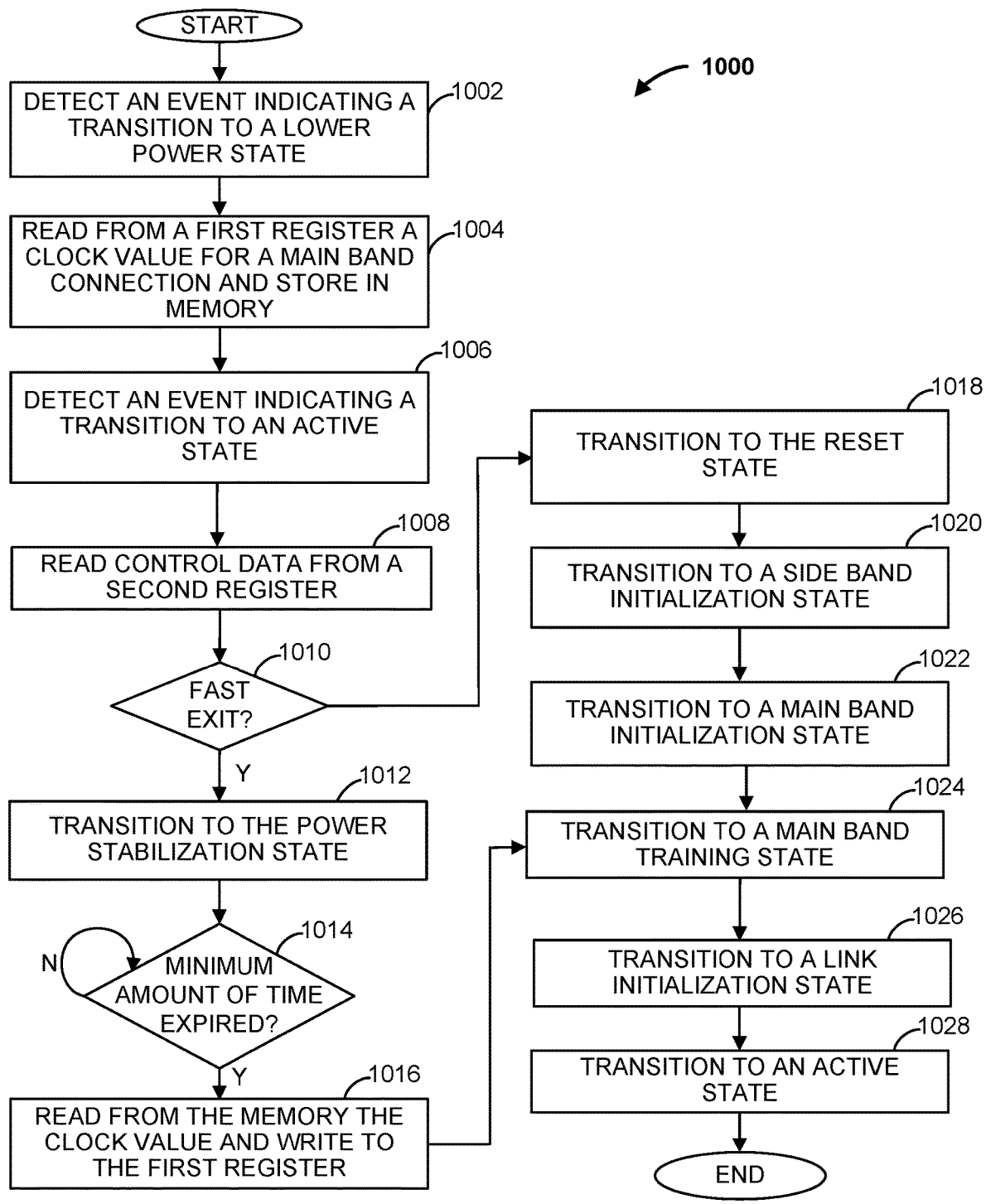
FIG. 10 is a flowchart of another exemplary process for transitioning a die between link states, according to some implementations.

FIG. 10 is a flowchart of an exemplary process 1000 for transitioning a die between link states, in accordance with some embodiments. Exemplary process 1000 may be carried out by a physical layer of a die, such as the physical logic 220 of CPU die 102. Beginning at block 1002, an event is detected that indicates a transition to a lower power state. For example, physical logic 220 may receive a signal indicating a transition from an "L0" state to an "L2" state. At block 1004, in response to the detection, the physical logic 220 reads from a first register, such as one located in register configuration space, a clock value for a main-band connection. For instance, physical logic 220 may read from the first register a main-band clock value characterizing a main-band clock achieved after a previous I/O rate negotiation process (e.g., negotiated during the last LINKINIT state 710). Further, the physical logic 220 may store the read value within memory, such as within a register that operates on auxiliary power (e.g., rather than, or in addition to, main power). The method then proceeds to block 1006.

At block 1006, the physical logic 220 detects an event indicating a transition to an active state (e.g., ACTIVE state 712). For instance, the physical logic 220 may receive a signal from the die-to-die adapter (e.g., die-to-die adapter 206) requesting the ACTIVE state on the RDI interface, or may receive a signal from a remote link partner (e.g., GPU die 104) requesting an L2 state exit. Based on the detected event, the method proceeds to block 1008.

At block 1008, control data is read from a second register (e.g., enhanced L2 state 714). For instance, physical logic 220 may read an L2 Exit Control Register 402 from register configuration space. As described herein, the L2 Exit Control Register 402 includes a Select L2 Exit Path bit indicating whether to proceed to the RESET state (e.g., Select L2 Exit Path=0), or to exit to the power stabilization state (e.g., Select L2 Exit Path=1), following an exit of the lower power state. At block 1010, the physical logic 220 may determine whether "Fast Exit" is enabled based on the Select L2 Exit Path bit of the data read from the L2 Exit Control Register 402. If the Select L2 Exit Path bit is set (e.g., "1"), the method proceeds to block 1012. Otherwise, if the Select L2 Exit Path bit is clear (e.g., "0"), the method proceeds to block 1018. In some examples, the physical logic 220 determines whether to enter the RESET state, or the power stabilization state, based on detecting a voltage level. In yet other examples, the physical logic 220 determines whether to enter the RESET state, or the power stabilization state, based on the detected event. For instance, the event may be a message (e.g., command) that indicates whether to enter the RESET state or power stabilization state.

At block 1018, the physical logic 220 transitions to the RESET state (e.g., RESET state 702) to complete reset processes, such as the reset processes described herein. Once the reset processes are complete, the method proceeds to block 1020, where the physical logic 220 transitions to a sideband initialization state (e.g., SBINIT state 704) to perform sideband initialization processes. Once complete with the sideband initialization processes, the method proceeds to block 1022, where the physical logic 220 transitions to the main-band initialization state (e.g., MBINIT state 706) and completes main-band initialization processes. The method then proceeds to block 1024, where the physical logic 220 transitions to the main-band training state (e.g., MBTRAIN state 708) to complete main-band training processes.

Back at block 1010, if "Fast Exit" is enabled, the method proceeds to block 1012 where the physical logic 220 transitions to the power stabilization state (e.g., $P_{ST}$ state 716). Proceeding to block 1014, and during the power stabilization state, the physical logic 220 may determine whether a minimum amount of time has expired. For instance, physical logic 220 may establish a time of at least 4 milliseconds, and may remain in the power stabilization state until the time expires. The amount of time may correspond to an amount of time (e.g., a maximum amount of time) that one or more clocks, such as the main-band clock, require to stabilize. Once the amount of time has passed, the method proceeds to block 1016.

At block 1016, the physical logic 220 reads from the memory the clock value stored (i.e., the clock value stored at block 1004). The physical logic 220 then writes the read clock value back to the first register. As such, physical logic 220 configures the corresponding clock (e.g., the main-band connection clock) to operate in accordance with how the clock was configured as a result of the previous rate negotiation process. From block 1016, the method proceeds to block 1024, where the physical logic 220 transitions to the main-band training state to complete main-band training processes.

Once the physical logic 220 completes the main-band training processes at block 1024, the method proceeds to block 1026 where the physical logic 220 transitions to a link initialization state (e.g., LINKINIT state 610). During the link initialization state the physical logic 220 completes link initialization processes as described herein. The method then proceeds to block 1028 where the physical logic 220 transitions to the active state (e.g., ACTIVE state 712). During the active state, the sideband channel and the main-band channel are fully operative in at least some examples. Process 1000 may repeat, for example, upon the detection of an additional event indicating a transition back to the lower power state at block 1002.

Implementation examples are further described in the following numbered clauses:

1. An die comprising:
   an adapter;
   an interface; and
   a physical layer coupled to the adapter and the interface, and wherein the physical layer is configured to:
      detect a first event indicating a transition to a lower power state;
      transition to a first lower power state or a second lower power state based on a state control setting;
      from the first lower power state:
         detect a second event indicating a transition to an active state; and
         transition to a reset state; and
      from the second lower power state:
         detect the second event indicating the transition to the active state;
         transition to a power stabilization state based on the second event, and remain in the power stabilization state for at least a threshold amount of time; and
         transition to a training state from the power stabilization state after the threshold amount of time.

2. The die of clause 1, wherein the physical layer is configured to:
   detect a voltage level; and
   determine the state control setting based on the voltage level.

3. The die of clause 1 wherein the physical layer comprises a register, and wherein the physical layer is configured to:
   read control data from the register; and
   determine the state control setting based on the control data.

4. The die of clause 1 wherein the first event includes the state control setting, and wherein the physical layer is configured to determine the state control setting based on the first event.

5. The die of clause 1, wherein the physical layer is configured to:
   read a clock configuration value from a second register in the second lower power state; and
   write the clock configuration value to the second register after the threshold amount of time.

6. The die of clause 5, wherein the clock configuration value is for a main-band clock of a main-band communication channel.

7. The die of any of clauses 1-6, wherein the physical layer is configured to perform at least one clock calibration process during the power stabilization state.

8. The die of any of clauses 1-7, wherein the threshold amount of time is at least 2 milliseconds.

9. The die of any of clauses 1-8, wherein the physical layer is configured to:
   transition from the training state to a link initialization state to perform at least one link initialization process; and
   transition from the link initialization state to the active state.

10. The die of any of clauses 1-9, wherein the physical layer comprises:
    main-band channel circuitry configured to communicate over a main-band communication channel; and
    sideband channel circuitry configured to communicate over a sideband communication channel, wherein the sideband channel circuitry receives auxiliary power when the physical layer is in the second lower power state.

11. The die of clause 10, wherein the second event is a signal received over the sideband communication channel when the physical layer is in the second lower power state.

12. The die of any of clauses 1-11, wherein the second event is a signal indicating an inactivity timer has expired.

13. The die of any of clauses 1-12, wherein the first lower power state is an L2 state.

14. An die comprising:
an adapter;
an interface; and
a physical layer coupled to the adapter and the interface, and wherein the physical layer is configured to:
  detect a first event indicating a transition to a lower power state;
  transition to the lower power state based on the first event;
  detect a second event indicating a transition to an active state;
  in response to detecting the second event, transition to a power stabilization state or a reset state based on a state control setting, wherein:
    when in the power stabilization state:
      remain in the power stabilization state for at least a threshold amount of time; and
      transition to a training state from the power stabilization state after the threshold amount of time.

15. The die of clause 14, wherein the physical layer is configured to:
  detect a voltage level; and
  determine the state control setting based on the voltage level.

16. The die of clause 14 wherein the physical layer comprises a register, and wherein the physical layer is configured to:
  read control data from the register; and
  determine the state control setting based on the control data.

17. The die of clause 14 wherein the first event includes the state control setting, and wherein the physical layer is configured to determine the state control setting based on the first event.

18. The die of any of clauses 14-17, wherein, when transitioning to the power stabilization state, the physical layer is configured to:
  read a clock configuration value from a register in the lower power state; and
  write the clock configuration value to the register after the threshold amount of time.

19. The die of any of clauses 14-18, wherein the clock configuration value is for a main-band clock of a main-band communication channel.

20. The die of any of clauses 14-19, wherein the physical layer is configured to perform at least one clock calibration process during the power stabilization state.

21. The die of any of clauses 14-20, wherein the threshold amount of time is at least 2 milliseconds.

22. The die of any of clauses 14-21, wherein the physical layer is configured to:
  transition from the training state to a link initialization state to perform at least one link initialization process; and
  transition from the link initialization state to the active state.

23. The die of any of clauses 14-22, wherein the physical layer comprises:
  main-band channel circuitry configured to communicate over a main-band communication channel; and
  sideband channel circuitry configured to communicate over a sideband communication channel, wherein the sideband channel circuitry receives auxiliary power when the physical layer is in the lower power state.

24. The die of clause 23, wherein the second event is a signal received over the sideband communication channel when the physical layer is in the lower power state.

25. The die of any of clauses 14-24, wherein the second event is a signal indicating an inactivity timer has expired.

26. The die of any of clauses 14-25, wherein the lower power state is an enhanced L2 state.

27. An apparatus comprising:
a die package comprising a first die and a second die communicatively coupled to the first die through an interconnect;
the first die comprising an adapter and a physical layer configured to communicate with the adapter, wherein the physical layer is configured to:
  receive a first signal from the adapter;
  based on the first signal, transition from a first link state where the physical layer receives main power for main-band circuitry to a second link state where the physical layer receives auxiliary power for sideband circuitry;
  transmit, via the interconnect, a second signal to the second die, the second signal indicating the second link state;
  receive a third signal from the adapter;
  based on the third signal, transition from the second link state to a power stabilization state and remain in the power stabilization state for at least a threshold amount of time; and
  transition to a training state from the power stabilization state after the threshold amount of time.

28. A method by a die comprising:
detecting, by a physical layer of the die, a first event indicating a transition to a lower power state;
transitioning, by the physical layer, to a first lower power state or a second lower power state based on a state control setting;
from the first lower power state:
detecting, by the physical layer, a second event indicating a transition to an active state; and
transitioning, by the physical layer, to a reset state; and
from the second lower power state:
detecting, by the physical layer, the second event indicating the transition to the active state;
transitioning, by the physical layer, to a power stabilization state based on the second event, and remaining in the power stabilization state for at least a threshold amount of time; and
transitioning, by the physical layer, to a training state from the power stabilization state after the threshold amount of time.

29. The method of clause 28, comprising:
detecting, by the physical layer, a voltage level; and
determining, by the physical layer, the state control setting based on the voltage level.

30. The method of clause 28, comprising:
reading, by the physical layer, control data from the register; and
determining, by the physical layer, the state control setting based on the control data.

31. The method of clause 28 wherein the first event includes the state control setting, the method comprising determining the state control setting based on the first event.

32. The method of any of clauses 28-31, comprising:
reading, by the physical layer, a clock configuration value from a second register in the second lower power state; and
writing, by the physical layer, the clock configuration value to the second register after the threshold amount of time.

33. The method of clause 32, wherein the clock configuration value is for a main-band clock of a main-band communication channel.

34. The method of any of clauses 28-33, comprising performing, by the physical layer, at least one clock calibration process during the power stabilization state.

35. The method of any of clauses 28-34, wherein the threshold amount of time is at least 2 milliseconds.

36. The method of any of clauses 28-35, comprising:
transitioning, by the physical layer, from the training state to a link initialization state to perform at least one link initialization process; and
transitioning, by the physical layer, from the link initialization state to the active state.

37. The method of any of clauses 28-36, comprising:
communicating, by the physical layer, over a main-band communication channel; and
communicating, by the physical layer, over a sideband communication channel, wherein the sideband circuitry receives auxiliary power when the physical layer is in the second lower power state.

38. The method of clause 37, wherein the second event is a signal received over the sideband communication channel when the physical layer is in the second lower power state.

39. The method of any of clauses 28-38, wherein the second event is a signal indicating an inactivity timer has expired.

40. The method of any of clauses 28-39, wherein the first lower power state is an L2 state.

41. A method by a die comprising:
detecting, by a physical layer of the die, a first event indicating a transition to a lower power state;
transitioning, by the physical layer, to the lower power state based on the first event;
detecting a second event indicating a transition to an active state;
in response to detecting the second event, transitioning, by the physical layer, to a power stabilization state or a reset state based on a state control setting, wherein:
when in the power stabilization state:
remaining in the power stabilization state for at least a threshold amount of time; and
transitioning, by the physical layer, to a training state from the power stabilization state after the threshold amount of time.

42. The method of clause 41, comprising:
detecting, by the physical layer, a voltage level; and
determining, by the physical layer, the state control setting based on the voltage level.

43. The method of clause 41, comprising:
reading, by the physical layer, control data from the register; and
determining, by the physical layer, the state control setting based on the control data.

44. The method of clause 41 wherein the first event includes the state control setting, the method comprising determining the state control setting based on the first event.

45. The method of any of clauses 41-44, when transitioning to the power stabilization state, comprising:
reading, by the physical layer, a clock configuration value from a register in the lower power state; and
writing, by the physical layer, the clock configuration value to the register after the threshold amount of time.

46. The method of clause 45, wherein the clock configuration value is for a main-band clock of a main-band communication channel.

47. The method of any of clauses 41-46, comprising performing, by the physical layer, at least one clock calibration process during the power stabilization state.

48. The method of any of clauses 41-47, wherein the threshold amount of time is at least 2 milliseconds.

49. The method of any of clauses 41-48, comprising:
transitioning, by the physical layer, from the training state to a link initialization state to perform at least one link initialization process; and
transitioning, by the physical layer, from the link initialization state to the active state.

50. The method of any of clauses 41-49, comprising:
communicating, by the physical layer, over a main-band communication channel; and
communicating, by the physical layer, over a sideband communication channel, wherein the sideband circuitry receives auxiliary power when the physical layer is in the lower power state.

51. The method of any of clauses 41-50, wherein the second event is a signal received over the sideband communication channel when the physical layer is in the lower power state.

52. The method of any of clauses 41-50, wherein the second event is a signal indicating an inactivity timer has expired.

53. The method of any of clauses 41-52, wherein the lower power state is an enhanced L2 state.

Although the methods described above are with reference to the illustrated flowcharts, many other ways of performing the acts associated with the methods may be used. For example, the order of some operations may be changed, and some embodiments may omit one or more of the operations described and/or include additional operations.

In addition, the methods and system described herein may be at least partially embodied in the form of computer-implemented processes and apparatus for practicing those processes. The disclosed methods may also be at least partially embodied in the form of tangible, non-transitory machine-readable storage media encoded with computer program code that, when executed, causes a machine to fabricate at least one integrated circuit that performs one or more of the operations described herein. For example, the methods may be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for causing a machine to fabricate the integrated circuit. The methods may also be at least partially embodied in the form of a computer into which computer program code is loaded or executed, such that, the computer becomes a special purpose computer for causing a machine to fabricate the integrated circuit. For instance, when implemented on a general-purpose processor, computer program code segments can configure the processor to create specific logic circuits. The methods may alternatively be at least partially embodied in application specific integrated circuits or any other integrated circuits for performing the methods.

In addition, terms such as "circuit," "circuitry," "logic," and the like can include, alone or in combination, analog circuitry, digital circuitry, hardwired circuitry, programmable circuitry, processing circuitry, hardware logic circuitry, state machine circuitry, and any other suitable type of physical hardware components. Further, the embodiments described herein may be employed within various types of devices such as networking devices, telecommunication devices, smartphone devices, gaming devices, enterprise devices, storage devices (e.g., cloud storage devices), and computing devices (e.g., cloud computing devices), among other types of devices.

The subject matter has been described in terms of exemplary embodiments. Because they are only examples, the claimed inventions are not limited to these embodiments. Changes and modifications may be made without departing the spirit of the claimed subject matter. It is intended that the claims cover such changes and modifications.

We claim:

1. A die comprising:
an adapter;
an interface; and
a physical layer coupled to the adapter and the interface, and wherein the physical layer is configured to:
 detect a first event indicating a transition to a lower power state;
 transition to a first lower power state or a second lower power state based on a state control setting;
 from the first lower power state:
  detect a second event indicating a transition to an active state; and
  transition to a reset state; and
 from the second lower power state:
  detect the second event indicating the transition to the active state;
  transition to a power stabilization state based on the second event, and remain in the power stabilization state for at least a threshold amount of time; and
  transition to a training state from the power stabilization state after the threshold amount of time.

2. The die of claim 1, wherein the physical layer is configured to:
detect a voltage level; and
determine the state control setting based on the voltage level.

3. The die of claim 1 wherein the physical layer comprises a register, and wherein the physical layer is configured to:
read control data from the register; and
determine the state control setting based on the control data.

4. The die of claim 1 wherein the first event includes the state control setting, and wherein the physical layer is configured to determine the state control setting based on the first event.

5. The die of claim 1, wherein the physical layer is configured to:
read a clock configuration value from a second register in the second lower power state; and
write the clock configuration value to the second register after the threshold amount of time.

6. The die of claim 5, wherein the clock configuration value is for a main-band clock of a main-band communication channel.

7. The die of claim 1, wherein the physical layer is configured to perform at least one clock calibration process during the power stabilization state.

8. The die of claim 1, wherein the threshold amount of time is at least 2 milliseconds.

9. The die of claim 1, wherein the physical layer is configured to:
transition from the training state to a link initialization state to perform at least one link initialization process; and
transition from the link initialization state to the active state.

10. The die of claim 1, wherein the physical layer comprises:
main-band channel circuitry configured to communicate over a main-band communication channel; and
sideband channel circuitry configured to communicate over a sideband communication channel, wherein the sideband channel circuitry receives auxiliary power when the physical layer is in the second lower power state.

11. The die of claim 10, wherein the second event is a signal received over the sideband communication channel when the physical layer is in the second lower power state.

12. The die of claim 1, wherein the second event is a signal indicating an inactivity timer has expired.

13. The die of claim 1, wherein the first lower power state is an L2 state.

14. An die comprising:
an adapter;
an interface; and
a physical layer coupled to the adapter and the interface, and wherein the physical layer is configured to:
 detect a first event indicating a transition to a lower power state;
 transition to the lower power state based on the first event;
 detect a second event indicating a transition to an active state;
 in response to detecting the second event, transition to a power stabilization state or a reset state based on a state control setting, wherein:
 when in the power stabilization state:
  remain in the power stabilization state for at least a threshold amount of time; and
  transition to a training state from the power stabilization state after the threshold amount of time.

15. The die of claim 14, wherein the physical layer is configured to:
detect a voltage level; and
determine the state control setting based on the voltage level.

16. The die of claim 14 wherein the physical layer comprises a register, and wherein the physical layer is configured to:
read control data from the register; and
determine the state control setting based on the control data.

17. The die of claim 14 wherein the first event includes the state control setting, and wherein the physical layer is configured to determine the state control setting based on the first event.

18. The die of claim 14, wherein, when transitioning to the power stabilization state, the physical layer is configured to:
read a clock configuration value from a register in the lower power state; and
write the clock configuration value to the register after the threshold amount of time.

19. The die of claim 18, wherein the clock configuration value is for a main-band clock of a main-band communication channel.

20. The die of claim 14, wherein the physical layer is configured to perform at least one clock calibration process during the power stabilization state.

21. The die of claim 14, wherein the threshold amount of time is at least 2 milliseconds.

22. The die of claim 14, wherein the physical layer is configured to:
   transition from the training state to a link initialization state to perform at least one link initialization process; and
   transition from the link initialization state to the active state.

23. The die of claim 14, wherein the physical layer comprises:
   main-band channel circuitry configured to communicate over a main-band communication channel; and
   sideband channel circuitry configured to communicate over a sideband communication channel, wherein the sideband channel circuitry receives auxiliary power when the physical layer is in the lower power state.

24. The die of claim 23, wherein the second event is a signal received over the sideband communication channel when the physical layer is in the lower power state.

25. The die of claim 14, wherein the second event is a signal indicating an inactivity timer has expired.

26. The die of claim 14, wherein the lower power state is an enhanced L2 state.

27. A method by a die comprising:
   detecting, by a physical layer of the die, a first event indicating a transition to a lower power state;
   transitioning, by the physical layer, to a first lower power state or a second lower power state based on a state control setting;
   from the first lower power state:
   detecting, by the physical layer, a second event indicating a transition to an active state; and
   transitioning, by the physical layer, to a reset state; and
   from the second lower power state:
   detecting, by the physical layer, the second event indicating the transition to the active state;
   transitioning, by the physical layer, to a power stabilization state based on the second event, and remaining in the power stabilization state for at least a threshold amount of time; and
   transitioning, by the physical layer, to a training state from the power stabilization state after the threshold amount of time.

28. A method by a die comprising:
   detecting, by a physical layer of the die, a first event indicating a transition to a lower power state;
   transitioning, by the physical layer, to the lower power state based on the first event;
   detecting a second event indicating a transition to an active state;
   in response to detecting the second event, transitioning, by the physical layer, to a power stabilization state or a reset state based on a state control setting, and:
   when in the power stabilization state:
   remaining in the power stabilization state for at least a threshold amount of time; and
   transitioning, by the physical layer, to a training state from the power stabilization state after the threshold amount of time.

* * * * *